June 18, 1968   W. A. MICHALOWICZ   3,389,188

PROCESS FOR PREPARING ANTHRACENE FROM PHENANTHRENE

Filed April 22, 1966

INVENTOR.
WILLIAM A. MICHALOWICZ
BY *William J. Kratz, Jr.*
his Agent 3,389,188
PROCESS FOR PREPARING ANTHRACENE
FROM PHENANTHRENE
William A. Michalowicz, Verona, Pa., assignor to
Koppers Company, Inc., a corporation of Delaware
Filed Apr. 22, 1966, Ser. No. 544,522
7 Claims. (Cl. 260—668)

ABSTRACT OF THE DISCLOSURE

Phenanthrene hydrogenated in diethylcyclohexane solvent with Ni catalyst at 195° C. yielded product 91% sym-octahydro-phenanthrene (OHP), 9% unsym. The OHP isomerized to sym-octahydroanthracene (OHA) over silica-13% alumina catalyst with negligible cracking and slight conversion to unsym-OHP when excessive contact time is avoided. Favorable isomerizing conditions are 200–250° C. with contact times short of conversion to the 56% OHA-44% OHP equilibrium. Effluent mixture is cooled to precipitate about 60% of the OHA and the mother liquor is recycled. Recrystallized OHA was aromatized with palladium catalyst to good yield of high quality anthracene.

---

Figure 1:
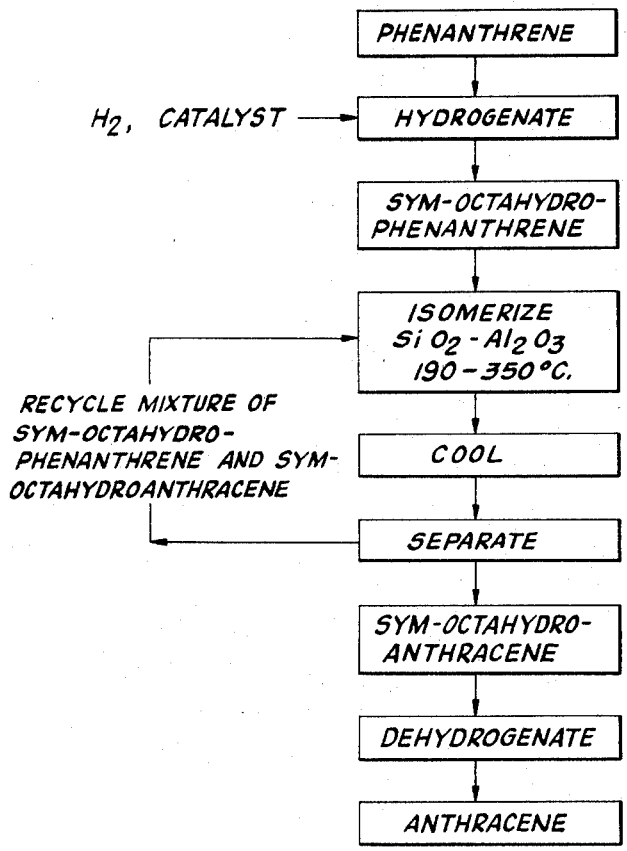

This invention relates to a process for converting phenanthrene into anthracene.

Phenanthrene and anthracene are usually obtained from coal tar. Generally more phenanthrene than anthracene is obtained. Anthracene, on the other hand, is the more valuable product. For example, anthracene is widely used for the purpose of forming various dyestuffs based on anthraquinone, the oxidation product of anthracene.

I have found that phenanthrene can be transformed into anthracene by a process which involves the steps of hydrogenation, isomerization, and subsequent dehydrogenation.

In accordance with my invention, phenanthrene is hydrogenated to yield sym-octahydrophenanthrene, the sym-octahydrophenanthrene is contacted with a silica-alumina catalyst at a temperature of 190–350° C. for a period of time sufficient to isomerize sym-octahydrophenanthrene to give a mixture of sym-octahydrophenanthrene and sym-octahydroanthracene, separating the sym-octahydroanthracene from the mixture and subsequently dehydrogenating the sym-octahydroanthracene to yield anthracene.

The process is illustrated by:

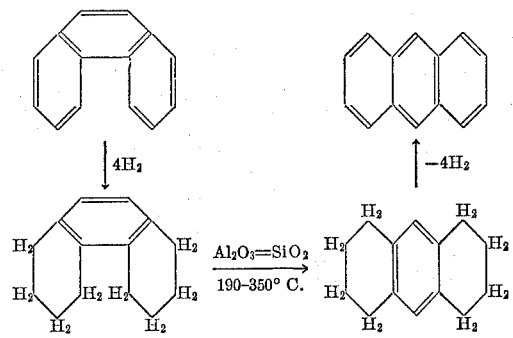

The starting material for my invention is preferably the phenanthrene derived from coal tars which is of very little utility in itself, but of course phenanthrene may be available as a by-product from various other chemical reactions and such phenanthrene would also be useable in my process.

The hydrogenation of phenanthrene may be carried out by any suitable hydrogenation process which results in the production of sym-octahydrophenanthrene. Processes for the hydrogenation of phenanthrene to octahydrophenanthrene are well known, see for example, J. R. Durland and H. Adkins, the Journal of the American Chemical Society, vol. 59, p. 135 (1937) and vol. 60, pp. 1501–5 (1938).

The sym-octahydrophenanthrene formed by the hydrogenation of phenanthrene is then subjected to an isomerization step which transforms the symmetrical octahydrophenanthrene to its isomer, sym-octahydroanthracene, by contacting the sym-octahydrophenanthrene with a solid phase silica-alumina catalyst.

The catalysts employed in my process are silica-alumina catalysts, such as commercially available, 87% $SiO_2$-13% $Al_2O_3$ solid phase catalyst. The silica-alumina catalysts are specific. Other acidic catalysts, such as alumina, or silica, alone, will not cause isomerization of sym-octahydrophenanthrene, nor will a solid phosphoric acid catalyst. The catalyst is reuseable and may be employed in a continuous or batch-wise process.

The temperature employed in the isomerization step is critical. The temperature must be maintained between about 190–350° C. If temperatures below 190° C. are used, a decreased reaction rate results which causes insufficient conversion of the sym-octahydrophenanthrene, while temperatures in excess of about 350° C. produce cracking of the sym-octahydrophenanthrene resulting in by-product formation. The cracking becomes more severe with increasing temperature. I prefer to use a temperature of between 200–250° C.

The isomerization may be carried out as a liquid phase or a vapor phase operation. The pressure employed during the isomerization step depends on whether a liquid or a vapor phase system is desired. In a liquid phase system, atmospheric pressure is preferably used. The pressure may of course be varied somewhat, while retaining the sym-octahydrophenanthrene in a liquid state, but it is not necessary to use pressures higher or lower than atmospheric pressure.

When a liquid phase system is employed, the contact time of sym-octahydrophenanthrene with the catalyst may vary from as little as 10 minutes to about 3 hours, depending upon the temperature employed. At a temperature of about 200° C., a contact time of about 3 hours is sufficient to obtain an equilibrium mixture of approximately 50% sym-octahydrophenanthrene and 50% sym-octahydroanthracene. If the temperature is raised to about 250° C., this equilibrium is obtained within a period of about 20 minutes. At 250° C., a residence time of greater than about 20 minutes results in increased by-product formation with consequent loss of desired product. However, if a temperature of 200° C. is employed, residence times beyond 3 hours do not result in substantial by-product formation but only changes the composition of the equilibrium mixture slightly.

When a vapor phase system is employed the contact time is much lower than that employed in the liquid phase system, being about 0.01 to 0.1 second. The use of a vapor phase system, however, also requires the use of very low pressures. Pressures below about 50 mm. mercury are necessary to establish a vapor phase system because of the boiling point of sym-octahydrophenanthrene. The boiling point of sym-octahydrophenanthrene is about 206° C. at 50 mm. mercury. Since the preferable range of temperature found for my process is in order of 200–250° C., it is necessary to reduce the pressure below about 50 mm. of mercury in order to establish a vapor phase system within the desired temperature range.

In either the vapor phase or the liquid phase system, the isomerization of sym-octahydrophenanthrene to sym-octahydroanthracene continues until an equilibrium mixture of about 56% sym-octahydroanthracene and 44% sym-octahydrophenanthrene is formed. Thereafter, it is necessary to remove the sym-octahydroanthracene from the mixture in order to cause additional conversion of the sym-octahydrophenanthrene.

The sym-octahydroanthracene produced by the isomerization of sym-octahydrophenanthrene is readily separated from the sym-octahydrophenanthrene by selective precipitation. Cooling the reaction mixture formed by the isomerization to temperatures at or below room temperature causes the precipitation of sym-octahydroanthracene from the mixture. Subsequent filtration, centrifuging, or other means will remove the sym-octahydroanthracene precipitate from the liquid mixture.

The solubility of sym-octahydroanthracene in sym-octahydrophenanthrene is such that about 20% of the sym-octahydroanthracene based upon the total weight of the two compounds in solution remains in the mixture. The mixture from my process normally contains about equal amounts of sym-octahydroanthracene and sym-octahydrophenanthrene, so about 60% of the produced sym-octahydronanthracene by the process is precipitated by the cooling and is removed. After separation of the filtrate or centrifugate the mother liquor, retaining about 20% by weight of sym-octahydroanthracene, is then recycled for subsequent isomerization to convert more of the sym-octahydrophenanthrene to sym-octahydroanthracene without effecting the residual sym-octahydroanthracene in the recycle mother liquor.

The separated sym-octahydroanthracene is itself useful in the production of pyromellitic acid. In the preparation of anthracene, however, the sym-octahydroanthracene is dehydrogenated to yield anthracene. The dehydrogenation step may be carried out by any suitable means, such as those described by J. Fulton et al., Journal of Chemical Society (1933) 1463–6, and H. Adkins et al., Journal of the American Chemical Society, vol. 63, p. 1320–5 (1941).

There has thus been provided a simple and economical method for the conversion of phenanthrene, a compound containing little utility, to anthracene, a highly utilized compound. My invention is schematically illustrated in FIGURE 1, and is further illustrated by the following examples:

EXAMPLE I

To a 10 gallon stirring autoclave there was charged 25 pounds of desulfurized phenanthrene (separated from coal tar), 25 pounds of diethylcyclohexane as solvent and 2.5 pounds of Harshaw nickel catalyst (Ni-0104P). The stirred mixture was hydrogenated at 191–198° C. at a hydrogen pressure of 800 p.s.i.g. When the rate of hydrogenation markedly decreased, as indicated by a flow meter in the system (theoretical weight of hydrogen absorbed for octahydrophenanthrene), the hydrogenation was terminated (ca. 3.5 hours). The product analyzed 90.7% sym-octahydrophenanthrene, 8.8% unsym-octahydrophenanthrene and 0.5% unidentified material. The product was distilled at 50 mm. mercury pressure. By distilling off 30% of the charge, the residue was 98.8% sym-octahydrophenanthrene.

EXAMPLE II

A vertical cylindrical reactor was filled with ⅛ inch extruded silica-alumina catalyst (87% $SiO_2$-13% $Al_2O_3$, 470 grams) and the reactor heated to 225° C. Sym-octahydrophenanthrene of 98% purity (from Example I) was pumped into the bottom of the reactor at such a rate that the residence time was 62 minutes. The effluent material, flowing from the top of the cylindrical reactor, comprised a mixture of 50% sym-octahydroanthracene and 48% sym-octahydrophenanthrene. This effluent material was cooled to 25° C. and centrifuged to yield a solid cake of crude sym-octahydroanthracene of approximately 90% purity, the remainder being sym-octahydrophenanthrene. The centrifugate was recycled to the cylindrical reactor, with make-up sym-octahydrophenanthrene. The solid cake of crude sym-octahydroanthracene was crystallized from 88% isopropanol-12% water solution. The crude sym-octahydroanthracene comprised 30% by weight of the recrystallization solution. The crystallization gave sym-octahydroanthracene is 99.2% purity, melting point 70.5–71.5° C., in 82% recovery. A subsequent recrystallization gave purer sym-octahydroanthracene (M.P. 71.5–72.5° C.) in 93% recovery based on the solid recrystallized. The crystallization mother liquors were stripped of solvent by distillation and the residue added to the make-up sym-octahydrophenanthrene.

EXAMPLE III

A reactor comprising a Pyrex tube of approximately 1 inch in diameter and 17 inches in length was filled with 115 ml. of silica-alumina catalyst (87% $SiO_2$-13% $Al_2O_3$, ⅛ inch pellets). A preheater tube of the same size, filled with stainless steel packing was used to vaporize sym-octahydrophenanthrene as it was added to the reactor via a dropping funnel. The bottom of the reactor was connected to an ice-cold receiver. The reactor and preheater were heated to 200° C. at 1 mm. mercury pressure. Sym-octahydrophenanthrene (101 grams) of 96% purity, produced as in Example I, was dropped into the preheater of the reactor at such a rate as to give a contact time of octahydrophenanthrene to catalyst of 0.03 second. The vaporized product, flowing from the bottom of the reactor, was condensed and cooled to 23° C., then filtered and the filtrate recycled. Four cycles were made, fresh catalysts being used for each cycle. The compositions of the condensed effluent vapors for the four cycles are shown in Table I:

TABLE I. — VAPOR PHASE ISOMERIZATION

| Cycle | Composition, percent | |
|---|---|---|
| | Sym-octahydrophen-anthrene | Sym-octahydroan-thracene |
| Starting Material | 96.0 | 0 |
| 1 | 48.5 | 48.0 |
| 2 | 53.0 | 43.5 |
| 3 | 49.5 | 44.5 |
| 4 | 47.5 | 41.5 |

EXAMPLE IV

A series of vapor phase isomerization experiments were performed to determine the affect of temperature upon the isomerization. The reactor described in Example II was used and the conditions were; pressure, 1 mm. mercury; 115 ml. silica-alumina catalyst (87% $SiO_2$-13% $Al_2O_3$); contact time 0.023–0.027 second; starting material, 96% sym-octahydrophenanthrene. The results are shown in Table II:

TABLE II

| Composition | Starting Material | Experiment | | | | |
|---|---|---|---|---|---|---|
| | | 1 | 2 | 3 | 4 | 5 |
| | | Temperature (° C.) | | | | |
| | | 150 | 200 | 250 | 350 | 388 |
| | | Percent | | | | |
| Sym-octahydroanthracene | 0 | (¹) | 48.0 | 50.5 | 44.5 | (²) |
| Sym-octahydrophenanthrene | 96 | (¹) | 48.5 | 43.5 | 36.5 | (²) |
| Unsym-octahydrophenanthrene | 0.9 | (¹) | 2.0 | 3.5 | 8.5 | (²) |
| Dihydrophenanthrene | 3.1 | (¹) | --- | --- | --- | (²) |
| Tetrahydrophenanthrene | 0 | (¹) | 0.5 | 0.5 | --- | (²) |
| Unknown | 0 | (¹) | 1 | 2 | 6 | (²) |

¹ Condensation of vapors on catalyst.
² Extensive cracking of hydrocarbon.

Thus it is shown that the temperature range in the vapor phase isomerization must be controlled. Low temperatures cause condensation on the catalyst with deactivation, while temperatures which are too high cause extensive by-product formation.

EXAMPLE V

The affect of contact time in a vapor phase isomerization was determined by making a series of experiments.

The conditions and apparatus used in the experiments were those of Example II, except that the contact time was varied as illustrated in Table III.

TABLE III

| Experiment | Contract Time (Sec.) | Sym-octahydro-anthracene, Percent | Sym-octahydro-phenanthrene, Percent |
|---|---|---|---|
| Starting Material | | 0 | 96.0 |
| A | 0.003 | 36.0 | 54.0 |
| B | 0.01 | 40.5 | 55.0 |
| C | 0.015 | 39.5 | 56.5 |
| D | 0.06 | 50.5 | 39.5 |
| E | 0.10 | 50.5 | 36.0 |

It can be seen that contact times below 0.01 second for vapor phase isomerization are insufficient to give adequate conversion while contact time in excess of about 0.10 second cause increased by-product formations.

EXAMPLE VI

Figure 2:
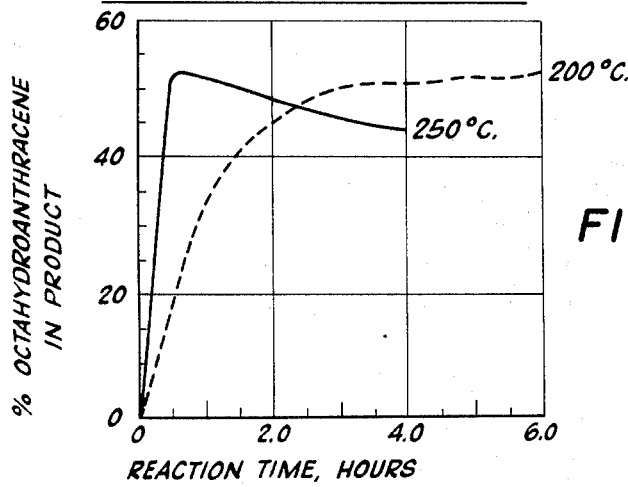

The temperature effect, in the preferred temperature range, upon the liquid phase isomerization, and the effect of contact time are shown in FIG. 2. Experiments were made wherein 130 grams of sym-octahydrophenanthrene and powdered, dried, silica-alumina catalyst (87% $SiO_2$-13% $Al_2O_3$) were heated to the stated temperatures, with stirring, in a glass flask. Samples were taken at various time intervals, analyzed by vapor phase chromatography and plotted on the curve shown in FIG. 2.

As can be seen from FIG. 2, the equilibrium mixture of sym - octahydroanthracene and sym - octahydrophenanthrene is rapidly reached at 250° C. but continued contact time causes by-product formation with a corresponding drop in yield of the desired sym-octahydroanthracene. A temperature of 200° C. requires a longer contact time but excessive contact time has less affect upon the product.

EXAMPLE VII

Sym-octahydroanthracene (100 grams, from Example II), and 10% palladium on carbon catalyst (5 grams) were stirred at atmospheric pressure and heated. The mixture was heated to 180–190° C. (gas evolution) and heating continued during ca. 5 hours until gas evolution ceased, at which time the temperature had reached 350° C. The resultant product was purified by distillation and gave 93 grams of anthracene, M.P. 215–216° C.

I claim:
1. A process for converting phenanthrene to anthracene comprising
    (a) hydrogenating phenanthrene to sym-octahydrophenanthrene,
    (b) contacting said sym-octahydrophenanthrene with a solid phase silica-alumina catalyst at a temperature of 190–350° C. for a period of time sufficient to isomerize said sym-octahydrophenanthrene to sym-octahydroanthracene to give a mixture of sym-octahydrophenanthrene and sym-octahydroanthracene.
    (c) separating said sym-octahydroanthracene from said mixture and
    (d) dehydrogenating said sym-octahydroanthracene.
2. The process of claim 1 wherein said sym-octahydroanthracene is separated from said mixture of sym-octahydrophenanthrene and sym-octahydroanthracene by cooling the mixture to precipitate sym-octahydroanthracene therefrom.
3. The process of claim 2 wherein said mixture after precipitation of sym-octahydroanthracene is recycled to be contacted with said catalyst.
4. The method of claim 1 wherein said temperature is 200–250° C.
5. A method of producing sym-octahydroanthracene comprising
    contacting sym-octahydrophenanthrene with a solid phase silica-alumina catalyst for a period of time sufficient to isomerize said sym-octahydrophenanthrene to sym-octahydroanthracene.
6. Process of claim 5 wherein the sym-octahydrophenanthrene in vapor phase is contacted with said solid phase silica-alumina catalyst at a temperature of 190–350° C. and at a reduced pressure for a period of 0.01 to 0.1 second.
7. Process of claim 5 wherein the sym-octahydrophenanthrene in liquid phase is contacted with said solid phase silica-alumina catalyst at a temperature of 190–350° C. for a period of 10 to 180 minutes.

References Cited

UNITED STATES PATENTS

| 2,438,148 | 3/1948 | Corson et al. | 260—667 X |
| 3,069,347 | 12/1962 | Bole et al. | 260—675 X |
| 3,336,407 | 8/1967 | Bushik | 260—668 |

FOREIGN PATENTS 694,961  7/1953  Great Britain.

OTHER REFERENCES

Schroeter: Chem. Ber. 57B, 1990–2003 (1924).

DELBERT E. GANTZ, *Primary Examiner.*

G. E. SCHMITKONS, *Assistant Examiner.*

Notice of Adverse Decision in Interference

In Interference No. 96,853 involving Patent No. 3,389,188, W. A. Michalowicz, PROCESS FOR PREPARING ANTHRACENE FROM PHENANTHRENE, final judgment adverse to the patentee was rendered Mar. 10, 1972, as to claim 5.

[*Official Gazette August 22, 1972.*]